W. P. BROWN.
Plow Attachments for Distributing Fertilizers.

No. 196,190. Patented Oct. 16, 1877.

Attest
Jno. P. Brooks
Christian Wolstrup

Inventor:
William Penn Brown,
by Louis Bagger & Co.
Attorneys.

UNITED STATES PATENT OFFICE.

WILLIAM PENN BROWN, OF HOLLAND'S STORE, ASSIGNOR OF ONE-HALF HIS RIGHT TO JUDGE S. FOWLER, OF BROWN'S FERRY, SOUTH CAROLINA.

IMPROVEMENT IN PLOW ATTACHMENTS FOR DISTRIBUTING FERTILIZERS.

Specification forming part of Letters Patent No. 196,190, dated October 16, 1877; application filed June 27, 1877.

*To all whom it may concern:*

Be it known that I, WILLIAM PENN BROWN, of Holland's Store, in the county of Anderson and State of South Carolina, have invented certain new and useful Improvements in Attachments for Plows; and I do hereby declare that the following is a full, clear, and exact description thereof, which will enable others skilled in the art to which it appertains to make and use the same, reference being had to the accompanying drawings, which form a part of this specification, and in which—

Figure 1:
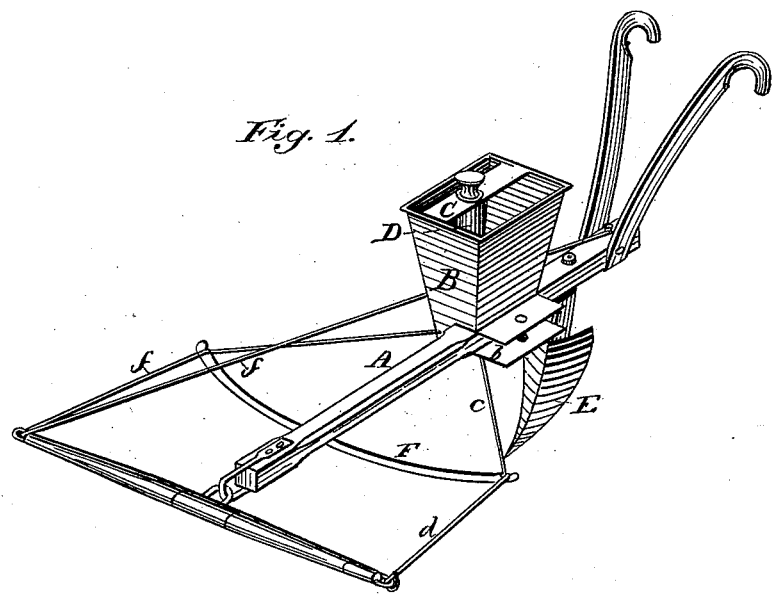
Figure 2:
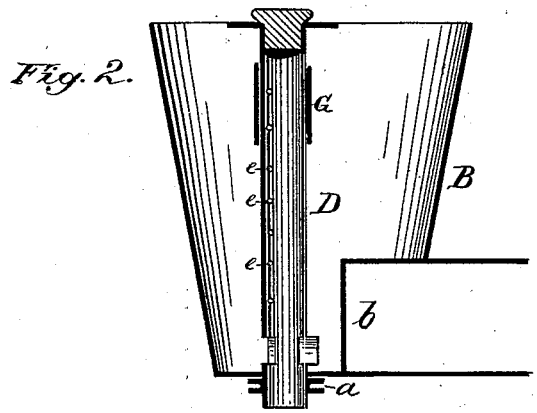

Figure 1 is a perspective view of a plow having my improved fertilizer-distributer attached, and Fig. 2 is a sectional view of the latter detached.

Similar letters of reference indicate corresponding parts in both figures.

My invention relates to an improved fertilizer-distributer to be attached to plows; and it consists in the construction and arrangement of parts, hereinafter more fully shown and specified.

In the drawings, A is the plow-beam. B is a box, made of tin, sheet-iron, or other suitable material, and having at the bottom a recess, $b$, so as to fit upon the plow-beam, to which it is attached in front of the share E. The box B has at its upper end a cross-brace, C, between which and the bottom is arranged a revolving tube, D, having perforations $e\ e$, through which the fertilizer may pass from the box into the tube, from whence it falls upon the ground. The lower perforations in tube D are constructed by making two parallel horizontal cuts or slots, and uniting them by a perpendicular cut. The flaps thus formed are turned into the box, thus forming stirrers, which, when the tube is revolved or oscillated, prevent the fertilizer from blocking up.

The tube D has, at its lower end, outside the box, a pulley, $a$. F is a wooden or metallic bow, pivoted under the plow-beam. The string $c$, uniting the ends of this bow, is wound once around the pulley $a$, so that when the bow F is reciprocated the tube D will oscillate.

A reciprocating motion is imparted to the bow F in the following manner: $d$ is a cord or rope, secured to one end of the bow, and passed forward, and connected to one end of the whiffletree. $f$ is another rope, attached to the opposite end of the bow, passed through a ring in the opposite end of the whiffletree, and returned to the plow-beam, to which it is attached within convenient reach of the operator.

The heavy swinging motion of the whiffletree incident to the operation of plowing is thus utilized to reciprocate bow F, through it operating the fertilizer-feed tube.

A sleeve, G, may be, and is, preferably arranged to slide upon the tube D, so that by it a number of the perforations $e$ may be covered, if desired, thus regulating the supply of fertilizing material.

The advantages of my improved fertilizer-distributer will be readily seen from the foregoing description.

The box B, being arranged in front of the plowshare, deposits the fertilizer in front of the same, thus causing it to be immediately covered. The supply is easily regulated by the sleeve G, and may be stopped entirely, whenever desired, by loosening or detaching rope $f$ from the plow-beam.

No power is required to operate the device except the swinging motion of the whiffletree.

The complete construction of my device is simple and cheap.

Having thus described my invention, I claim and desire to secure by Letters Patent of the United States—

The box B, having vertical revolving feed-tube D, provided with perforations $e\ e$ and pulley $a$, in combination with the pivoted bow F and operating-cords, substantially as and for the purpose herein shown and specified.

In testimony that I claim the foregoing as my own I have hereto affixed my signature in presence of two witnesses.

WILLIAM PENN BROWN.

Witnesses:
DAVID B. ANDERSON,
JOHN B. ANDERSON.